United States Patent [19]

Imura et al.

[11] 4,183,643
[45] Jan. 15, 1980

[54] AUTOMATIC FOCUSING SYSTEM FOR USE IN CAMERA

[75] Inventors: Toshinori Imura; Akira Yamanaka, both of Sakai, Japan

[73] Assignee: Minolta Camera Kabushiki Kaisha, Osaka, Japan

[21] Appl. No.: 954,175

[22] Filed: Oct. 24, 1978

[30] Foreign Application Priority Data

Oct. 27, 1977 [JP] Japan .............................. 52-129430

[51] Int. Cl.$^2$ .............................................. G03B 3/10
[52] U.S. Cl. ...................................................... 354/25
[58] Field of Search ............................. 354/25, 195, 198; 352/140; 355/56; 356/4

[56] References Cited

U.S. PATENT DOCUMENTS

| 3,723,003 | 3/1973 | Vockenhuber et al. ......... 352/140 X |
| 3,945,023 | 3/1976 | Stauffer ............................... 354/25 |

FOREIGN PATENT DOCUMENTS 7828 4/1967 Japan .

Primary Examiner—Michael L. Gellner
Attorney, Agent, or Firm—Wenderoth, Lind & Ponack

[57] ABSTRACT

A camera employing an automatic focusing system has a movable objective lens which is automatically moved to a properly focused position in accordance with a distance signal indicative of the distance between the camera and a target object to be photographed from a distance measuring element. The automatic focusing system further includes a discriminator which discriminates whether the distance measuring element properly produces the distance signal or fails to produce such distance signal. When the discriminator detects that the distance measuring element fails to produce the distance signal, the movable objective lens is automatically moved to a pan-focal position.

14 Claims, 3 Drawing Figures

AUTOMATIC FOCUSING SYSTEM FOR USE IN CAMERA

BACKGROUND OF THE INVENTION

The present invention relates to a camera provided with an automatic focusing system wherein an objective lens assembly of the camera is automatically shifted in an axial direction thereof to an optimum position for focusing a target object to be photographed on a focal plane of the camera, in accordance with a signal indicative of a distance between the target object and the camera.

Conventionally, there have been proposed various types of the above described camera provided with the automatic focusing system and one of which is disclosed in a Japanese Patent Publication No. 7828/1967. The automatic focusing system disclosed therein includes a movable objective lens which moves between a hyperfocal or infinity position and near position relative to the focal plane, and a distance measuring device operatively coupled to the objective lens to assume a position corresponding to that of the movable objective lens. As the movable objective lens moves from the hyperfocal position to the near position, a focus signal indicative of the focus condition of the objective lens for the target object varies and the objective lens is stopped when the focus signal assumes a value indicative of a proper focus condition.

If a conventional focus detecting device fails to obtain a proper focus condition signal due to the fact that the target object is too dark to be detected or the portion to be focused is a plane wall having no distinctive contrast, or by some other reasons, the movable objective lens will move to the extreme near position, or a shutter of the camera may not be released where such proper focus signal is utilized for allowing the release of shutter mechanism.

From this aspect, this known system provides a provisional distance setting device which, when no proper focus signal is produced from a focus detecting device, produces a provisional distance signal for setting the movable objective lens to a pan-focal position at which the lens is held in position to be focused on the target object located at a middle distance away from the camera, so that substantially in-focus images can be obtained for the object at any distance by virtue of depth of field.

However, according to this publication, the provisional distance setting device operates after the objective lens has been completely moved to the extreme near position. Therefore, when it is necessary to set the objective lens to the pan-focal position due to the failure in operation of the focus detecting device, the objective lens is so designated as to move from the hyperfocal position to the near position and then return back to the pan focal position. Thus, it takes a considerably long time before the camera is ready to release the shutter mechanism. Furthermore, in the case where such provisional distance setting device is to be employed in the automatic focusing system of the type in which the objective lens is driven from either extreme to a proper focus position in accordance with a signal obtained prior to the actuation of the lens, it is necessary to provide means for moving the objective lens, for example, from the near position to the pan-focal position, in addition to means for moving the same, for ordinary control, from the hyperfocal position to the near position. Thus, the mechanism for operating the movable lens will become considerably complicated.

Moreover, in the case where the provisional distance setting device of the above described type is employed in the automatic focusing system operable on the basis of the principle of triangulation and using a rotating mirror for scanning the field, it is necessary to provide means for rotating the mirror from its initial position to a final position to detect whether or not the target object is within the entire range of distance and also means for rescanning the mirror back to a required position, if no target object is detected within said range, for setting the objective lens to the pan-focal position. If the camera is so arranged as to position the objective lens to the pan-focal position during the first scanning of the mirror, it is necessary to provide additional device for detecting the unfavorable condition of the target object, e.g. darkness or low contrast and a circuit for transacting the output signal from such detecting device.

SUMMARY OF THE INVENTION

Accordingly, a primary object of the present invention is to provide an automatic focusing system for use in a camera or the like wherein the objective lens can be directly moved to the pan-focal position when the distance measuring device produces no distance signal.

A further object of the present invention is to provide an automatic focusing system of the above described type which is simple in construction and can readily be manufactured at low cost.

In accordance with a preferred embodiment of the invention, an automatic focusing system for use in a camera comprises a distance measuring means which produces a zone signal indicative of one zone of distance where a target object to be photographed is located. This one zone of distance is selected from a plurality of zones relative to the camera. A discriminator coupled to the distance measuring means is provided for producing, when said distance measuring means fails to produce the zone signal, a substitute signal similar to character to the zone signal and indicative of a particular zone of distance where the target object is most expected to be located. This particular zone of distance is selected from a plurality of zones relative to the camera. An objective lens mounted in a body of the camera moves between hyperfocal and near positions through one or more intermediate focal positions and is stopped to one of the focal positions, including the hyperfocal and near positions relative to a focal plane of the camera for focusing an image of the target object located within the zone on the focal plane.

The automatic focusing system, according to the present invention, further comprises a control means connected to the distance measuring means for moving the objective lens automatically to one of said focal positions corresponding to said one zone so identified by the zone signal, and also to a particular focal position, when the distance measuring means fails to produce the zone signal, corresponding to the particular zone so identified by the substitute signal.

BRIEF DESCRIPTION OF THE DRAWINGS

These and other objects and features of the present invention will become apparent from the following description taken in conjunction with preferred embodiments thereof with reference to the accompanying drawings, in which.

DETAILED DESCRIPTION OF THE INVENTION

Figure 1:
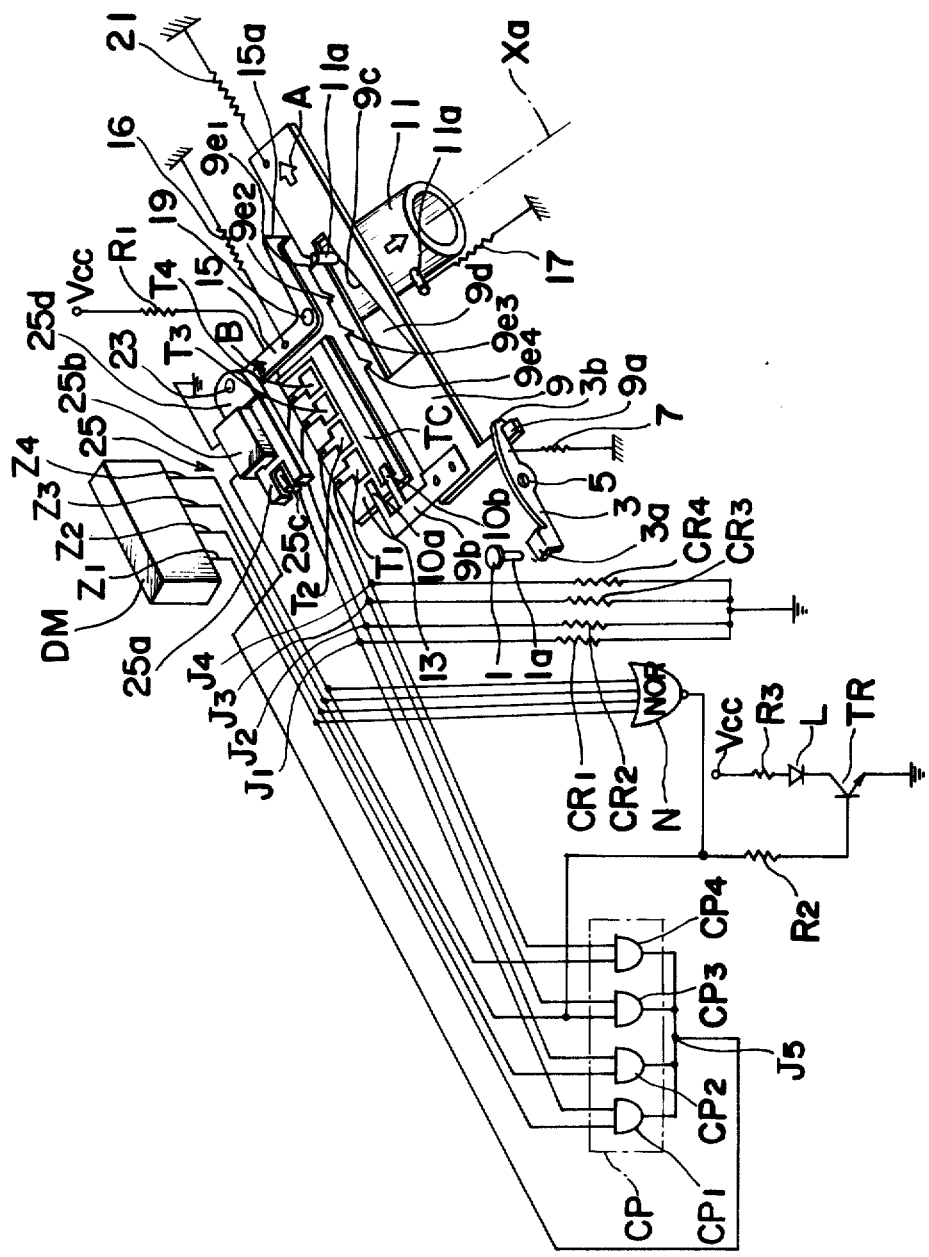
FIG. 1 is a schematic diagram of an automatic focusing system according to one embodiment of the present invention.

Before the description of the present invention proceeds, it is to be noted that like parts are designated by like reference numerals throughout the accompanying drawings.

Referring to FIG. 1, there is shown one embodiment of an automatic focusing system according to the present invention. The automatic focusing system comprises an automatic rangefinder for producing a signal indicative of one particular zone of distances where a target object to be photographed may be located, said one particular zone of distances being selected from a plurality of zones such as zones A, B, C and D (FIG. 2) classified as near, first intermediate, second intermediate and far zones, respectively, relative to the camera, and a lens positioning mechanism for positioning an objective lens assembly 11 at a corresponding position for focusing the target object, located in said one particular zone, on the focal plane where a film is placed. Each of the components is described in detail, hereinafter.

Figure 2:
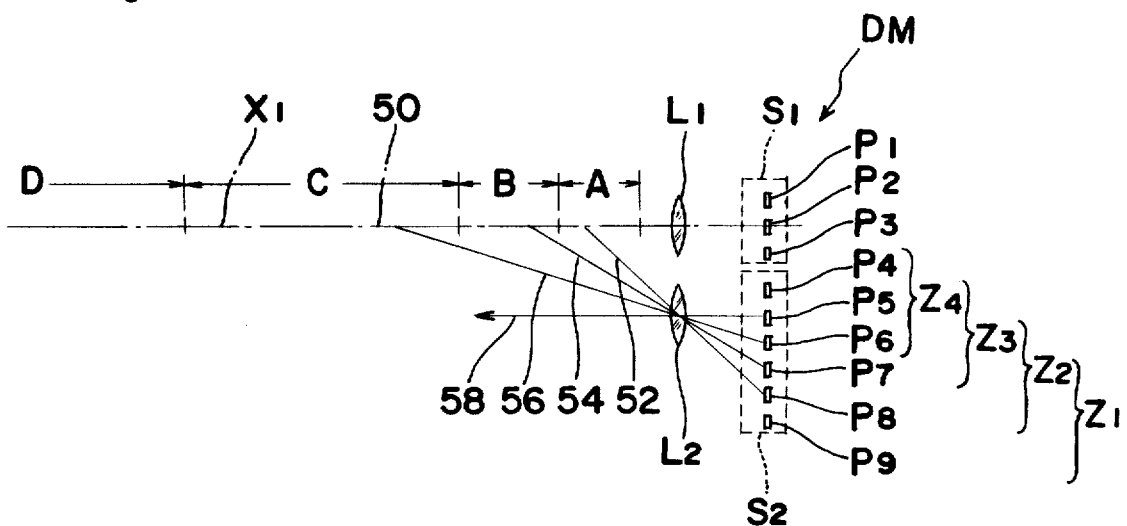
FIG. 2 is a schematic diagram of a distance measuring element employed in the system shown in FIG. 1.

The automatic rangefinder comprises a distance measuring element DM of any known type such as one disclosed in U.S. Pat. No. 3,945,023 of Norman L. Stauffer or one disclosed in U.S. Pat. No. 3,723,003 of Vockenhuber et al. One example is schematically shown in FIG. 2 and which comprises first and second stationary lens $L_1$ and $L_2$ positioned side-by-side with their principal planes contained in the same plane. Positioned behind the first lens $L_1$ is a first stationary sensing means $S_1$ which is so arranged as to receive radiation from a target object through the first lens $L_1$. A second stationary sensing means $S_2$ is similarly placed behind the second lens $L_2$ to receive radiation from the object through the second lens $L_2$. The first sensing means $S_1$ includes, in the example shown, three photoresponsive elements $P_1$, $P_2$ and $P_3$ while the second stationary sensing means $S_2$ includes, in the example shown, six photoresponsive elements $P_4$, $P_5$, $P_6$, $P_7$, $P_8$ and $P_9$. It is to be noted that the distance measuring element DM is positioned in the camera in such a manner as to render the optical axis $X_1$ of the first lens $L_1$ to extend in parallel to an optical axis $X_a$ of the objective lens assembly 11 employed in the camera. The operation of the distance measuring element DM will now be described hereinbelow.

Still referring to FIG. 2, four distinct zones of distances A, B, C and D are indicated along a first optical path 50 coinciding with the optical axis $X_1$ of the first lens $L_1$. Radiation from a target object which may be located in any one of zones along the optical path 50 will pass through the first stationary lens $L_1$ and fall on the photoresponsive elements $P_1$, $P_2$ and $P_3$ of the first sensing means $S_1$. Depending upon the position of the target object, radiation from that object will also pass along a second optical path, defined by the radiation passing through the second stationary lens $L_2$, and fall on the photoresponsive elements $P_4$, $P_5$, $P_6$, $P_7$, $P_8$ and $P_9$ of the second sensing means $S_2$. Four axes of radiation 52, 54, 56 and 58 are shown in FIG. 2 as emanating from the four different positions and passing through the second stationary lens $L_2$.

If an object is located at the position within the zone A, for example, radiation therefrom will pass through the first stationary lens $L_1$ and fall on the first sensing means $S_1$ but it is not essential that a focused image be so formed. It is sufficient if a light intensity distribution identifiable by the photoresponsive elements is formed at the sensing means. When an object is at said position, an intensity distribution will be formed at the first sensing means $S_1$ and that distribution will be centered upon the photoresponsive element $P_2$ thereof. Radiation from the object at said position will also pass generally along the line 52 through the stationary lens $L_2$ and fall on the remote portion of the second sensing means $S_2$. More specifically, the intensity distribution formed on the second sensing means $S_2$ from the object at said position will be centered upon the photoresponsive element $P_8$ of the second sensing means $S_2$. Therefore, with an object at said position, the intensity of the radiation falling on the photoresponsive element $P_1$ in the first sensing means $S_1$ will be substantially equal to the intensity of the radiation falling on the photoresponsive element $P_7$ of the second sensing means $S_2$ since both intensity distribution patterns are substantially the same. Similarly, the intensity of the radiation falling on the photoresponsive element $P_2$ of the first sensing means $S_1$ will be substantially equal to the intensity of the radiation falling on the photoresponsive element $P_8$ of the second sensing means $S_2$, and the intensity of the radiation falling on the photoresponsive elements $P_3$ and $P_9$ will also be substantially equal. Therefore, when circuit means (not shown) are provided, which determines that the intensity distribution falling on the photoresponsive elements $P_1$, $P_2$ and $P_3$ substantially matches the intensity distribution falling on the elements $P_7$, $P_8$ and $P_9$, it can be said that the object, the distance to which from the rangefinder device is to be determined, is generally located at the position within the zone A.

Similarly, if the circuit means connected to the first and second sensing means $S_1$ and $S_2$ determines that the intensity distribution falling on the photoresponsive elements $P_1$, $P_2$ and $P_3$ of the first sensing means $S_1$ is substantially identical to the intensity distribution falling on the photoresponsive elements $P_6$, $P_7$ and $P_8$ of the second sensing means $S_2$, the object whose displacement from the range-finding device is to be sought is generally located at the position within the zone B. In like manner, if the intensity distribution falling on the photoresponsive elements $P_1$, $P_2$ and $P_3$ of the first sensing means $S_1$ substantially matches the intensity distribution falling on the three photoresponsive elements $P_5$, $P_6$ and $P_7$ of the sensing means $S_2$, it can be said that the object, from which the radiation forming such intensity distributions emanates, is generally located at a position within the zone C. And finally, if the intensity distribution falling on the photoresponsive elements $P_1$, $P_2$ and $P_3$ of the first sensing means $S_1$ substantially matches the intensity distribution falling on the first three photoresponsive elements $P_4$, $P_5$ and $P_6$ of the second sensing means $S_2$, it is understood that the object from which the radiation forming such intensity distribution emanates, is generally located at a position within the zone D.

Once the zone in which the object is located is determined in the manner described above, a distance signal carrying high voltage is produced from one of four outputs $Z_1$, $Z_2$, $Z_3$ and $Z_4$ of the distance measuring device, said four outputs $Z_1$ to $Z_4$ representing the four different zones A, B, C and D, respectively.

Referring again to FIG. 1, the automatic rangefinder further comprises a comparator CP including four AND elements $CP_1$, $CP_2$, $CP_3$ and $CP_4$ having their first inputs connected to the four outputs $Z_1$, $Z_2$, $Z_3$ and $Z_4$ of the distance measuring device, respectively. Second inputs of the AND elements $CP_1$, $CP_2$, $CP_3$ and $CP_4$ are connected to resistors $CR_1$, $CR_2$, $CR_3$ and $CR_4$, respectively, by way of respective junctions $J_1$, $J_2$, $J_3$ $J_4$. The resistors $CR_1$ to $CR_4$ are connected to the ground. Since the resistors $CR_1$, $CR_2$, $CR_3$ and $CR_4$ are of equal resistance, the junctions $J_1$, $J_2$, $J_3$ and $J_4$ produce the same amount of high voltage signal when a predetermined voltage is impressed across such resistors $CR_1$ to $CR_4$. The junctions $J_1$, $J_2$, $J_3$ and $J_4$ are also connected to terminal plates $T_1$, $T_2$, $T_3$ and $T_4$, respectively, which are bonded in a row on a platform 13 rigidly mounted in the camera. The platform 13 is also bonded with a common terminal plate TC which is connected to a source of electric power Vcc through a resistor $R_1$. The common terminal plate TC is adapted to be sequentially connected to the terminal plates $T_1$, $T_2$, $T_3$ and $T_4$ by means of a bridging plate 9b in a manner as will be described in detail later.

According to the present invention, the outputs $Z_1$, $Z_2$, $Z_3$ and $Z_4$ of the distance measuring element DM are also connected to four inputs of a NOR element N for producing a high signal from an output of the NOR element N when none of the outputs $Z_1$, $Z_2$, $Z_3$ and $Z_4$ produces the high distance signal. The output of the NOR element N is connected to the first terminal of the AND element $CP_3$ and also to the base of a transistor TR through a resistor $R_2$. The emitter of the transistor TR is grounded while the collector of the same is connected to the source of electric power Vcc through a light emitting diode L and a resistor $R_3$. When the NOR element N is actuated to produce a high level signal therefrom, the transistor TR is turned on to light the light emitting diode L for the indication.

The outputs of the AND elements $CP_1$, $CP_2$, $CP_3$ and $CP_4$ are connected to each other at a junction $J_5$ and, in turn, connected to one input of a coil switch assembly 25. The other input of the coil switch assembly 25 is connected to the ground, that is, to the body of the camera. The coil switch assembly 25 includes a frame 25a made of magnetic material, a permanent magnet 25c for normally magnetizing the frame 25a, a coil 25b wound about the frame 25a for, when energized, cancelling the magnetic attraction of the permanent magnet 25c by developing a counteracting magnetic force on the frame 25a, and a contact member 25d made of magnetic material. The contact member 25d is normally held in contact with the frame 25a by the magnetic force of attraction produced by the permanent magnet, but is disengaged from the frame 25a when the coil 25b is energized. The contact member 25d is connected to an L-shaped lever 15 which is included in the lens positioning mechanism described hereinbelow.

The lens positioning mechanism comprises an elongated and rectangular movable plate 9 coupled with a spring means 21 for urging the elongated movable plate 9 in a longitudinal direction as indicated by an arrow A. The movable plate 9 has a triangle opening 9d formed approximately at a central portion thereof and having a slanted edge defined at 9c. The slanted edge 9c slidingly contacts a projection 11a rigidly mounted on the objective lens assembly 11. The objective lens assembly 11 is so arranged as to move between hyperfocal or infinity and near positions in alignment with the optical axis Xa of the lens 11, and is biased towards, for example, the near position by means of an urging spring 17. As the movable plate moves in the direction A, the projection 11a slidingly moves along the slanted edge 9c to cause the objective lens assembly 11 to move towards the near position. The bridging plate 9b which is made of electric conductive material and rigidly carried by the movable plate 9 extends outwardly from the movable plate 9 and has a pair of arms 10a and 10b extending in parallel to a direction of movement of the movable plate 9. As the bridging plate 9b moves toward the direction A together with the movable plate 9, the arm 10b slidingly moves over the common terminal plate TC, while the arm 10a slidingly and sequentially moves over the terminal plates $T_1$, $T_2$, $T_3$ and $T_4$. The movable plate 9 is formed with four detent recesses $9e_1$, $9e_2$, $9e_3$ and $9e_4$ defined in one side edge of the plate 9 for the engagement with the L-shaped lever 15. The L-shaped lever 15 has a substantially intermediate portion pivotally mounted on a pin 19 provided on the body of the camera, and is biased by a spring 16 in a direction indicated by an arrow B about the pin 19. One end of the lever 15 is provided with the contact member 25d as described above while the other end of the lever 15 is provided with a hook 15a which is engageable in any one of the detent recesses $9e_1$, $9e_2$, $9e_3$ and $9e_4$ when rotated in the direction B. The movable plate 9 has one end formed with a projection 9a for the engagement with a lever 3. The lever 3 has a substantially intermediate portion thereof pivotally mounted on a pin 5, provided on the camera, and one end portion thereof formed with a bent-over portion 3a providing a flat area. The other end portion of the lever 3 remote from the bent-over portion 3a is formed with a hook 3b engageable with the projection 9a. The lever 3 is biased by an urging spring 7 towards an engaged position in which the hook 3b is engaged to the projection 9a as shown in FIG. 1. The disengagement of the hook 3b from the projection 9a is effected when a shutter button 1 is depressed to such an extent that a shaft 1a extending downwardly from the button 1 presses the bent-over portion 3a to rotate the lever 3 about the pin 5 against the biasing force. The operation of the automatic focusing system described above will now be given hereinbelow.

Starting from the position as shown in FIG. 1 in which a shutter releasing mechanism (not shown) is loaded and ready for taking a photographic picture, the automatic focusing system is actuated to measure the distance between the target object and the camera by a suitable switch means such as by the application of a finger pressure to the shutter button 1. Upon receipt of the power, the distance measuring element DM produces a high level signal from one of the outputs $Z_1$, $Z_2$, $Z_3$ and $Z_4$, indicating that the target object T is within one of the zones A, B, C and D. Assuming that the target object T is within the zone B, the high level signal will be produced from the output $Z_2$. Thereafter, the photographer pushes down the shutter button 1 to disengage the movable plate 9 from the lever 3. Thus, the movable plate 9 is moved in the direction A at a predetermined speed together with the bridging plate 9d. As the terminal plates $T_1$, $T_2$, $T_3$ and $T_4$ are sequentially bridged and shortcircuited to the common terminal plate TC by the bridging plate 9d, a predetermined voltage will be produced sequentially across the resistors $CR_4$, $CR_3$, $CR_2$ and $CR_1$. Such voltage is sequentially applied to the AND elements $CP_4$, $CP_3$, $CP_2$ and $CP_1$. According to the above assumption, since the high level signal is produced from the output $Z_2$ while low level signals are produced from the other outputs $Z_1$, $Z_3$ and $Z_4$, only the AND element $CP_2$ can be triggered on to produce a high level signal therefrom. More particularly, when the arm 10a of the bridging plate 9b slidingly moves over the terminal plate $T_3$, the voltage produced across the resistor $CR_2$ triggers the AND element $CP_2$ on to generate the high level signal therefrom. Such high level signal is applied to the coil 25b for producing a magnetic force in the frame 25a. This magnetic force so produced in the frame 25a counteracts with the magnetic force of the permanent magnet 25c to release the contact member 25d, which has been attracted to the frame 25a by the magnetic force of the magnet 25c, from the frame 25a to allow the rotation of the L-shaped lever 15 in the direction B. Upon rotation of the L-shaped lever 15, the hook 15a engages into the detent recess $9e_3$ to stop the movement of the movable plate 9. Thus, the objective lens assembly 11 which has been moving towards the near position by the action of the spring 17 stops at the first intermediate position where the target object located within the zone B can be properly focused on a focal plane (not shown) in the camera.

It is to be noted that the movable plate 9 may be coupled with another movable plate (not shown) which starts to move at the same time when the movable plate 9 starts to move but continuously moves further even after the movable plate 9 is stopped by the engagement between the hook 15a and any one of the detent recesses, passing over the position corresponding to the position of the movable plate 9 where the furthest detent recess $9e_4$ may be engaged by the hook 15a, thereby ensuring the positioning of the objective lens assembly 11 before the film surface is exposed to the target object. Thereafter, the completion of the movement of said another movable plate substantially releases the shutter to expose the film surface.

It is to be noted that the terminal plates $T_1$, $T_2$, $T_3$ and $T_4$ are arranged in a row in such an order as to correspond to the order of development of the zones D, C, B and A in the object space away from the objective lens assembly 11 of the camera, respectively. Yet, each of the terminal plates $T_1$, $T_2$, $T_3$ and $T_4$ has such a width, as measured in the direction of the movement of the bridging plate 9b, that the electric contact between the terminal plate $T_1$, $T_2$, $T_3$ and $T_4$ and the common terminal plate TC through the bridged plate 9b continues for a period of time required for the objective lens assembly 11 to axially move a distance corresponding to the distance range of the corresponding zone.

It is further to be noted that the detent recesses $9e_1$, $9e_2$, $9e_3$ and $9e_4$ are positioned in such a manner that the hook 3b may be engaged into a recess $9e_1$, $9e_2$, $9e_3$ or $9e_4$ immediately after the arm 10a moves past the corresponding terminal plate $T_1$, $T_2$, $T_3$ or $T_4$.

When the target object is considerably dark to such an extent as to produce a very weak radiation therefrom or when the target object scarecely has such a contrast as in a white plain wall as to produce a uniform radiation therefrom, it is impossible to discriminate which one of the four groups of photoresponsive elements ($P_4$, $P_5$, $P_6$; $P_5$, $P_6$, $P_7$; $P_6$, $P_7$, $P_8$; and $P_7$, $P_8$, $P_9$) of the second sensing means $S_2$ has the intensity distribution identical to that of the photoresponsive elements $P_1$, $P_2$ and $P_3$ of the first sensing means $S_1$. In the above case or in other cases where the distance measuring element DM produces no distance signal from any of the outputs $Z_1$, $Z_2$, $Z_3$ and $Z_4$, the NOR element N is actuated to produce a high level signal therefrom. Said high level signal from the NOR element N is applied to the first input of the AND element $CP_3$. Therefore, the AND element $CP_3$ will produce a high level output signal therefrom as a result of the high level signal applied to the second input of the AND element $CP_3$ from the terminal $T_2$ in the manner described above. This high level output signal from the AND element $CP_3$ is applied to the coil 25b of the coil switch assembly 25, so that the lens positioning mechanism is actuated to engage the hook 15a of the L-shaped lever 15 with the detent recess $9e_2$. Thus, the objective lens assembly 11 is moved to the second intermediate position which corresponds to a pan-focal position.

In order to notify the operator that the objective lens assembly 11 is moved to the pan-focal position due to the failure in operation of distance measuring element DM, the light emitted from the light emitting diode L may be viewed through the viewfinder.

Figure 3:
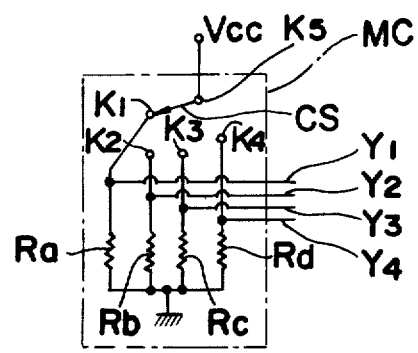
FIG. 3 is a circuit diagram connectable to the system shown in FIG. 1 for the manual operation thereof.

Referring to FIG. 3, there is shown a circuit diagram of a manual control circuit MC which may be coupled to the automatic rangefinder. The manual control circuit MC includes four resistors $R_a$, $R_b$, $R_c$ and $R_d$ which are connected between ground and four different terminals $K_1$, $K_2$, $K_3$ and $K_4$, respectively. A main terminal $K_5$ receiving voltage from the voltage source Vcc is selectively connectable, one at a time, to any one of the four terminals $K_1$ to $K_4$ through a connecting arm CS, so as to produce a predetermined high voltage at one terminal which is in contact with the main terminal $K_5$. The terminals $K_1$, $K_2$, $K_3$ and $K_4$ are connected to the first inputs of the AND elements $CP_1$, $CP_2$, $CP_3$ and $CP_4$, respectively, for providing said predetermined high voltage to the first input of the AND element. The AND element which is provided with the predetermined high voltage from the manual control circuit MC operates to control the lens positioning mechanism in a manner as described above.

Since the automatic rangefinder, according to the present invention, is so arranged as to produce the distance signal from the distance measuring element before the lens is shifted, it is possible to discriminate whether or not the distance measuring element is producing any distance signal. Therefore, when the distance measuring element fails to produce the distance signal due to an insufficient brightness or contrast in the target object, the objective lens assembly 11 can be directly shifted to the pan-focal position within a reasonably short time.

Although the present invention has been fully described by way of examples with reference to the accompanying drawings, it is to be noted that various changes and modifications are apparent to those skilled in the art. For example, the output of the NOR element N which has been described as being connected to the first input of the AND element $CP_3$, can be connected to the first input of any other AND element. Therefore, such changes and modifications, unless they depart from the true scope of the present invention, should be construed as included therein.

What we claim:
1. An automatic focusing system for use in a camera, comprising:
 a camera objective lens including a movable lens element movable along the optical axis of the objective lens to change the focusing thereof;

focus signal generating means for generating, prior to the movement of said lens element, a focus signal indicative of the axial position of said lens element for focusing said objective lens on a desired target object;

a discriminator coupled to said focus signal generating means for producing a substitute signal indicative of a particular position of the lens element when said focus signal generating means fails to produce said focus signal; and control means for controlling the position of said lens element in accordance with said focusing signal or said substitute signal.

2. An automatic focus system as claimed in claim 1, wherein said focus signal generating means includes a distance detection means for generating a signal, as said focus signal, indicative of a camera-to-object distance.

3. An automatic focus system as claimed in claim 2, wherein said distance detection means includes a plurality of photoelectric members for producing a zone signal indicative of a plurality of zones of object-to-camera distance in which the target object is located.

4. An automatic focus system as claimed in claim 3, wherein said distance detection means includes a plurality of output terminals, at any one of which is generated an output in accordance with the zone where the target object is located, and said discriminator generates said substitute signal corresponding to the output at a particular one of said terminals when an output is not generated at any of said terminals.

5. An automatic focusing system for use in a camera comprising, in combination:

distance measuring means for producing a zone signal indicative of one zone of distance where a target object to be photographed is located, said one zone of distance being selected from a plurality of zones relative to the camera;

a discriminator coupled to said distance measuring means for producing, when said distance measuring means fails to produce said zone signal, a substitute signal indicative of a particular zone of distance selected from a plurality of zones relative to the camera;

an objective lens movable to one of a plurality of focal positions relative to a focal plane of the camera for focusing on said focal plane an image of the target object located within said zone; and control means for controlling the position of said objective lens automatically in accordance with said zone signal when said zone signal is produced, and with said substitute signal when said distance measuring means fails to produce said zone signal.

6. An automatic focusing system as claimed in claim 5, wherein said distance measuring means includes a plurality of output terminals for producing zone signals of different distances at different output terminals, the number of said output terminals coinciding with the number of said zones.

7. An automatic focusing system as claimed in claim 6, wherein the failure of said distance measuring means occurs when no zone signal is produced at any output terminal.

8. An automatic focusing system as claimed in claim 6, wherein said control means comprises a plurality of control elements which are respectively connected to said output terminals of said distance measuring means, the number of said control elements coinciding with the number of the output terminals of said distance measuring means, said objective lens being moved to one focal position by one control element which is connected to one output terminal of the distance measuring means producing said zone signal.

9. An automatic focusing system as claimed in claim 8, wherein said substitute signal produced from the discriminator is applied to one of said control elements.

10. An automatic focusing system as claimed in claim 8, wherein each of said control elements is an AND element having first and second input terminals, said output terminals of said distance measuring means being connected respectively to the first input terminals of the AND elements.

11. An automatic focusing system as claimed in claim 10, wherein said control means further comprises:

a plurality of fixed terminal plates equal in number to the number of said AND elements, said fixed terminal plates being connected respectively to the second input terminals of the AND elements;

a movable terminal plate movable simultaneously with the movement of said objective lens, said movable terminal plate being sequentially brought into contact with said fixed terminal plates; and means for impressing a predetermined voltage to said movable terminal plate for sequentially applying said predetermined voltage to said fixed terminal plates and in turn to the second input terminals of said AND elements.

12. An automatic focusing system as claimed in claim 5, wherein said discriminator comprises a NOR element.

13. An automatic focusing system as claimed in claim 5, further comprising an indication means actuated when said discriminator produces said substitute signal.

14. An automatic focusing system as claimed in claim 13, wherein said indication means is light emitting diode coupled to said discriminator.

* * * * *